US011991161B2

(12) United States Patent
Saito

(10) Patent No.: US 11,991,161 B2
(45) Date of Patent: May 21, 2024

(54) NON-TRANSITORY COMPUTER-READABLE MEDIUM HAVING INSTRUCTIONS, COMMUNICATION SYSTEM, AND SERVER

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 443 days.

(21) Appl. No.: 15/913,062

(22) Filed: Mar. 6, 2018

(65) Prior Publication Data
US 2018/0262477 A1  Sep. 13, 2018

(30) Foreign Application Priority Data

Mar. 9, 2017  (JP) .................................. 2017-045339

(51) Int. Cl.
*H04L 9/00* (2022.01)
*G06F 21/60* (2013.01)
(Continued)

(52) U.S. Cl.
CPC ............ *H04L 63/08* (2013.01); *G06F 21/608* (2013.01); *G06F 21/629* (2013.01); *H04L 63/0876* (2013.01)

(58) Field of Classification Search
CPC ..... G06F 21/608; G06F 21/629; H04L 63/08; H04L 63/0876
See application file for complete search history.

(56) References Cited

U.S. PATENT DOCUMENTS 8,917,401 B2 * 12/2014 Saito .................. H04N 1/00413
358/1.16
9,232,083 B2 * 1/2016 Miyazawa ......... H04N 1/00925
(Continued)

FOREIGN PATENT DOCUMENTS

JP    2001-022676 A    1/2001
JP    2010165101 A    7/2010
(Continued)

OTHER PUBLICATIONS

Official Action dated Oct. 6, 2020 received from the Japanese Patent Office in related application JP 2017-045339 together with English language translation.

*Primary Examiner* — Daniel B Potratz
*Assistant Examiner* — Syed M Ahsan
(74) *Attorney, Agent, or Firm* — Scully, Scott, Murphy & Presser, PC

(57) ABSTRACT

A server includes: a processor; and a memory storing instructions therein, the instructions, when executed by the processor, causing the server to: transmit, in a case where the first function information is received from the specific device, the first authentication information to the specific device; receive, in a case where the first authentication information is input to a first function execution device after the first authentication information is transmitted to the specific device, the first authentication information from the first function execution device; and execute, in a case where the first authentication information is received from the first function execution device, a first enabling process for enabling the first function in the first function execution device, wherein the first function is identified by the first function information in the memory associated with the first authentication information.

18 Claims, 14 Drawing Sheets

(51) Int. Cl.
*G06F 21/62* (2013.01)
*H04L 9/40* (2022.01)

(56) References Cited

U.S. PATENT DOCUMENTS

| | | | |
|---|---|---|---|
| 2013/0010329 A1 | 1/2013 | Yuki | |
| 2015/0277816 A1* | 10/2015 | Adachi | H04L 63/083 358/1.15 |
| 2015/0381842 A1* | 12/2015 | Mori | G06F 3/1288 358/1.14 |

FOREIGN PATENT DOCUMENTS

| | | | |
|---|---|---|---|
| JP | 2013-015995 A | 1/2013 |
| JP | 2014006783 A | 1/2014 |

\* cited by examiner

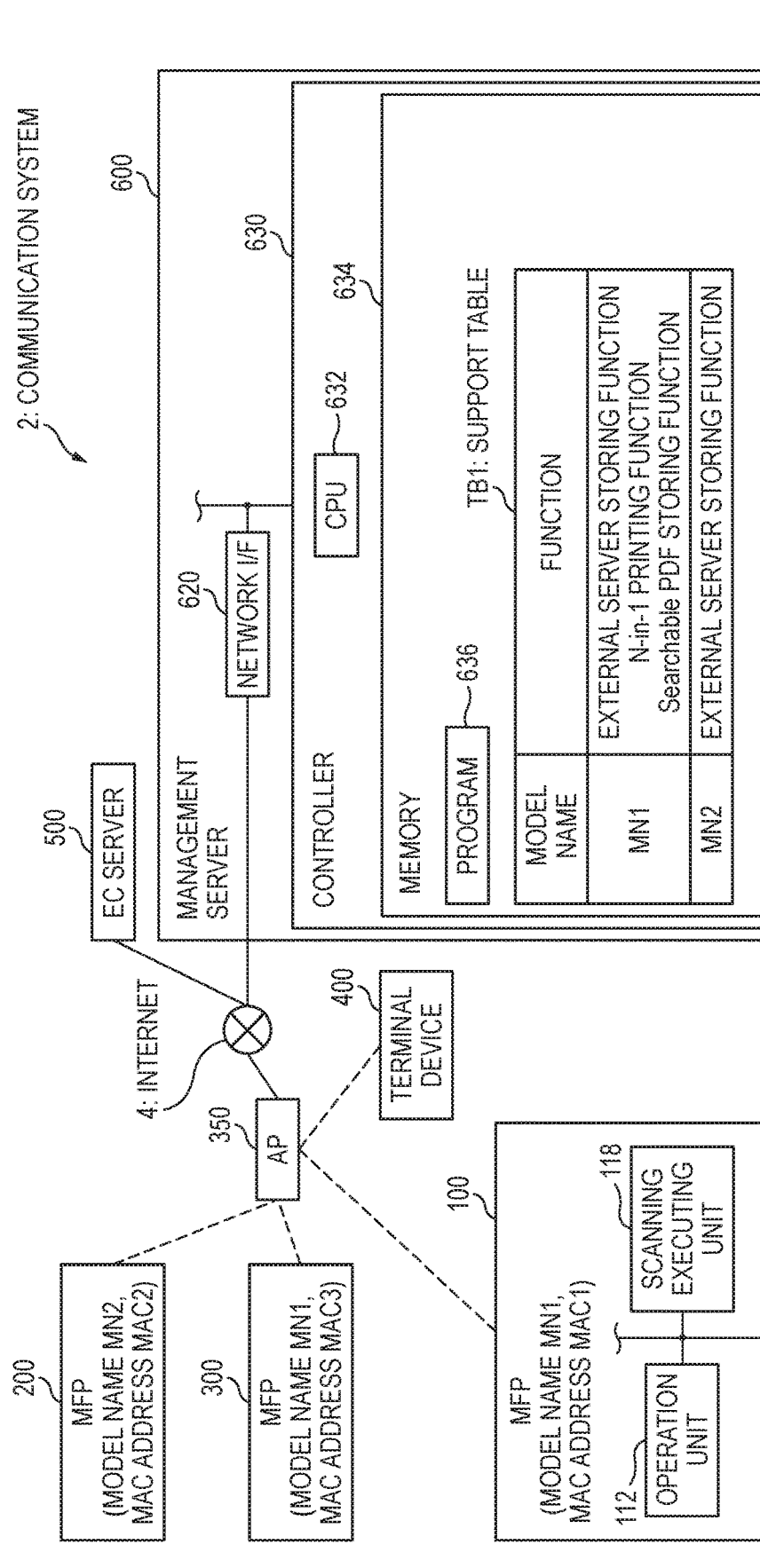

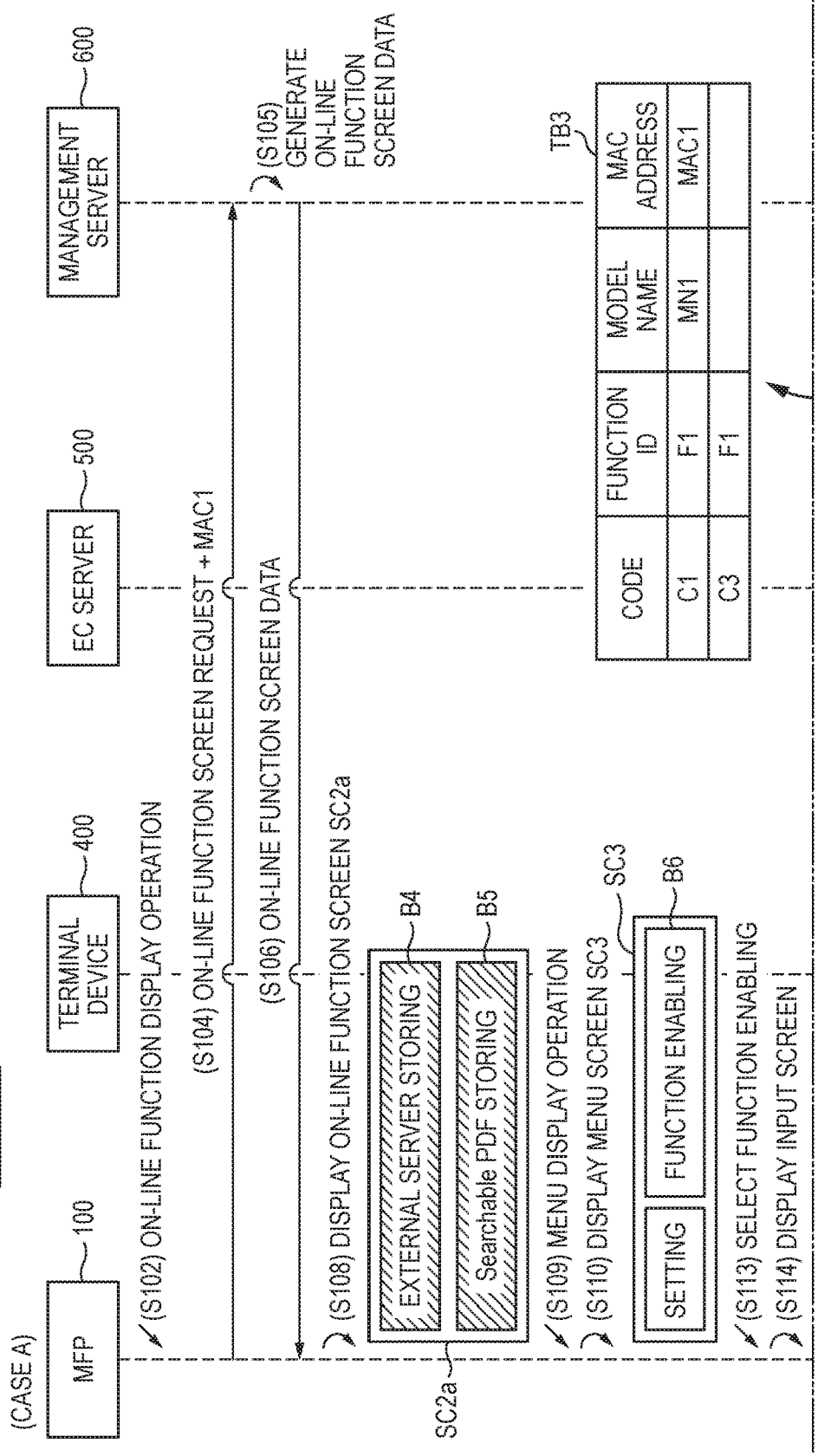

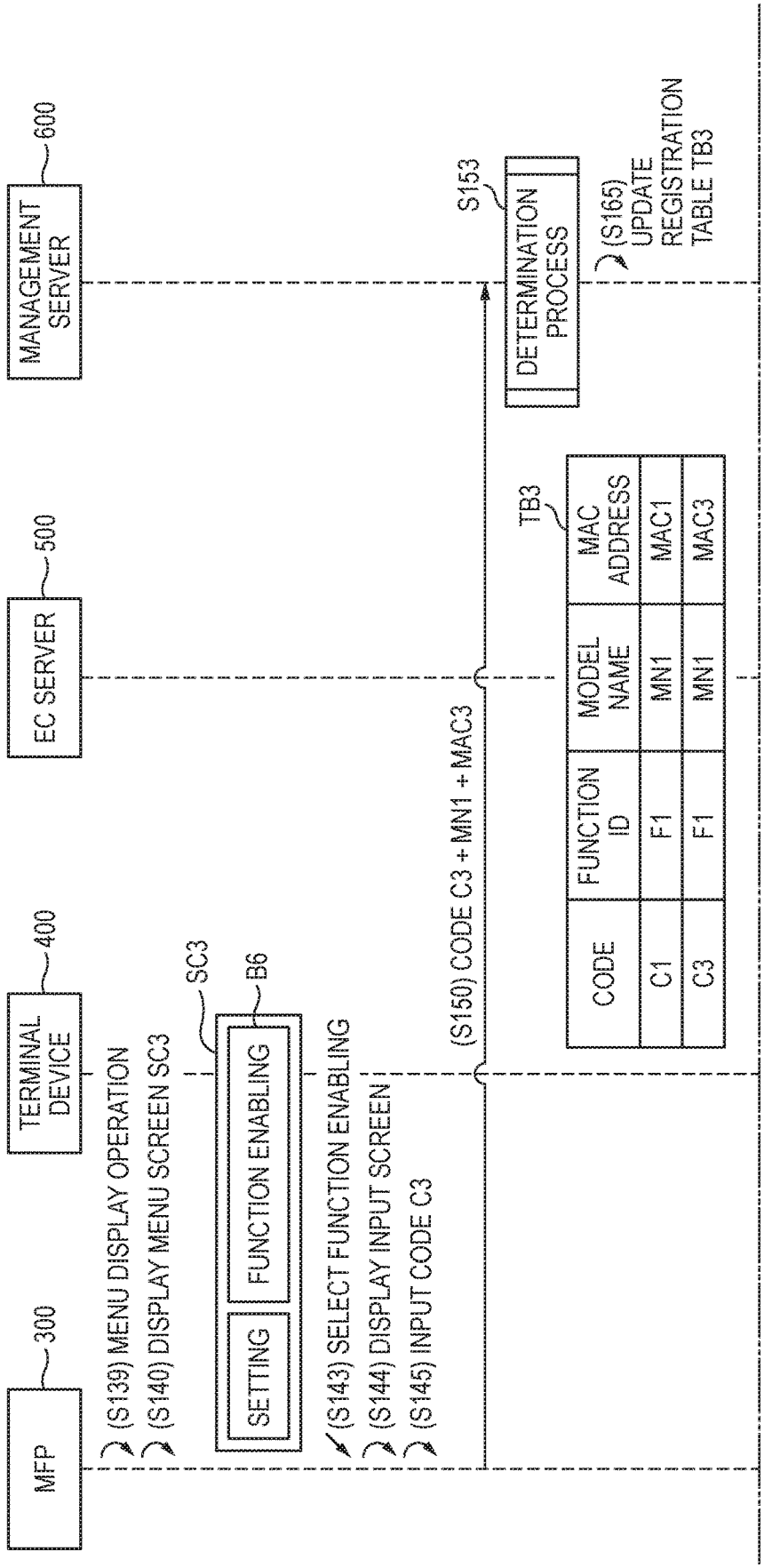

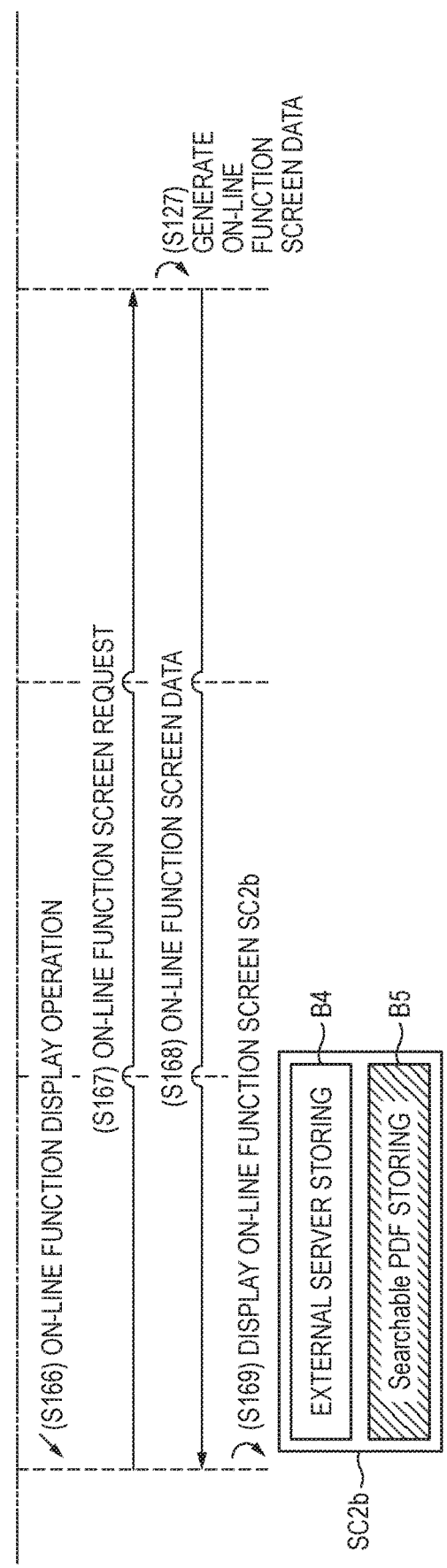

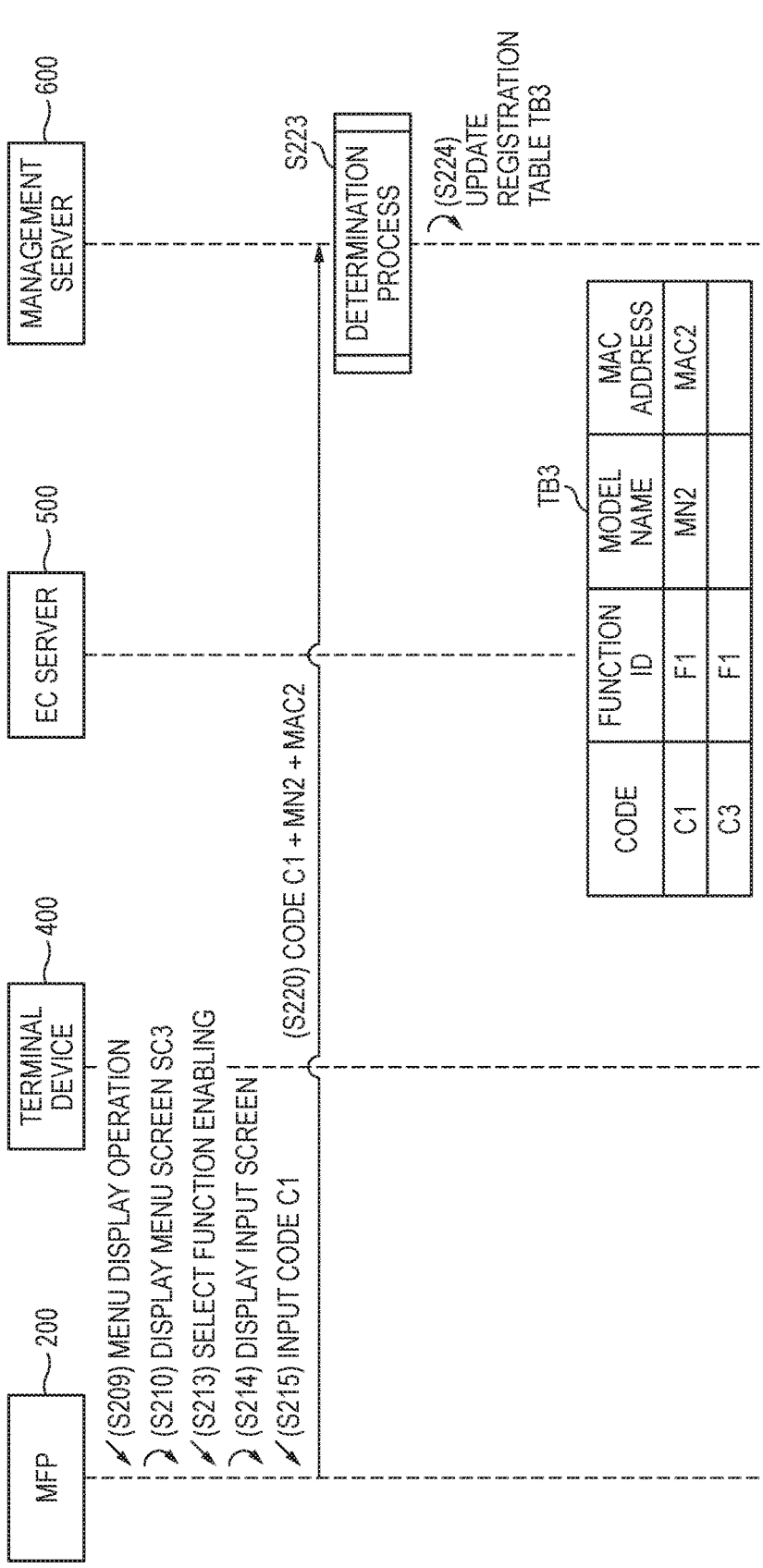

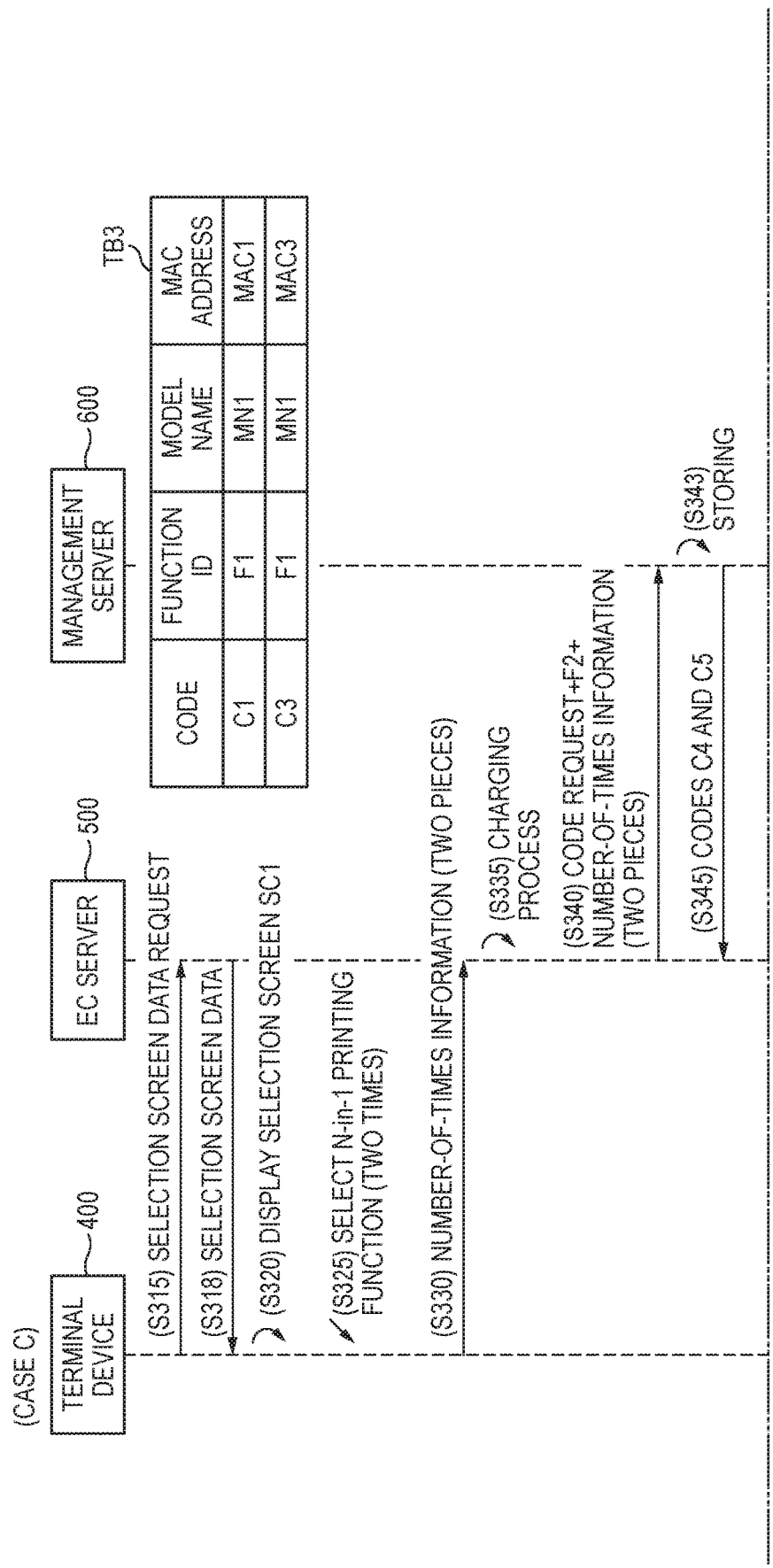

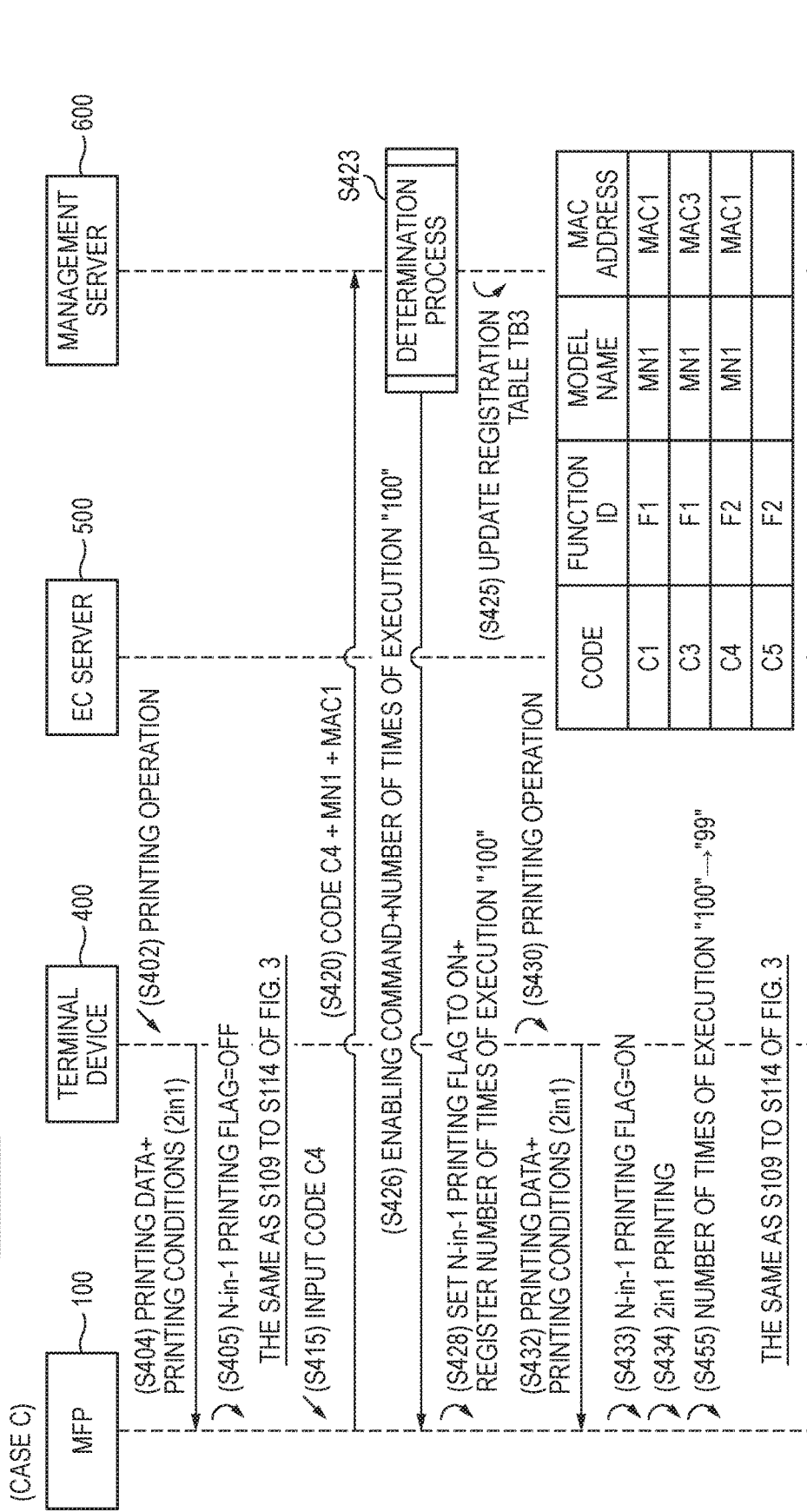

NON-TRANSITORY COMPUTER-READABLE MEDIUM HAVING INSTRUCTIONS, COMMUNICATION SYSTEM, AND SERVER

CROSS-REFERENCE TO RELATED APPLICATION

This application claims priority from Japanese Patent Application No. 2017-045339 filed on Mar. 9, 2017, the entire subject matter of which is incorporated herein by reference.

TECHNICAL FIELD

This specification discloses a technique for enabling a function in a function execution device.

BACKGROUND ART

A background art discloses a system including a terminal device, an image forming device, a virtual device management service, and a license management service. A user executes an operation of associating a product and the image forming device with each other on a product management data association screen displayed on the terminal device. The terminal device transmits information indicating the association between the product and the image forming device to the virtual device management service. The virtual device management service acquires product data of the product associated with the image forming device from the license management service, and transmits the acquired product data to the image forming device. The image forming device acquires an extensible application and a license corresponding to the product data from the license management service, and enables the extensible application based on the acquired license.

SUMMARY

In the technique, the user selects a device identifier of the image forming device, in which the extensible application should be enabled, on the product management data association screen. According to this configuration, the user may erroneously select an identifier different from the identifier of the image forming device in which the extensible application should be enabled.

This specification discloses a technique in which a user can appropriately select a function execution device in which a function should be enabled.

A non-transitory computer-readable medium of this disclosure has instructions that, when executed by a computer mounted on a server, cause the computer to: receive first function information for identifying a first function from a specific device; store, in a case where the first function information is received from the specific device, the first function information and first authentication information in a memory in association with each other; transmit, in a case where the first function information is received from the specific device, the first authentication information to the specific device; receive, in a case where the first authentication information is input to a first function execution device after the first authentication information is transmitted to the specific device, the first authentication information from the first function execution device; and execute, in a case where the first authentication information is received from the first function execution device, a first enabling process for enabling the first function in the first function execution device, wherein the first function is identified by the first function information in the memory associated with the first authentication information.

According to the above-described configuration, in a case where the first function information is received from the specific device, the server stores the first function information and the first authentication information in the memory in association with each other, and transmits the first authentication information to the specific device. The server executes the first enabling process in a case where the first authentication information is input to the first function execution device and then is received from the first function execution device. Accordingly, the first authentication information is input to the first function execution device and thus the first function execution device in which the first function should be enabled can appropriately be selected.

A communication system includes: a server; and a first function execution device. The server includes: a processor; and a memory storing instructions therein, the instructions, when executed by the processor, causing the server to: receive first function information for identifying a first function from a specific device; store, in a case where the first function information is received from the specific device, the first function information and first authentication information in a memory in association with each other; transmit, in a case where the first function information is received from the specific device, the first authentication information to the specific device; receive, in a case where the first authentication information is input to a first function execution device after the first authentication information is transmitted to the specific device, the first authentication information from the first function execution device; and execute, in a case where the first authentication information is received from the first function execution device, a first enabling process for enabling the first function in the first function execution device, wherein the first function is identified by the first function information in the memory associated with the first authentication information, and wherein the first function execution device includes: a processor; and a memory storing instructions therein, the instructions, when executed by the processor, causing the first function execution device to: transmit the first authentication information to the server in a case where the first authentication information is input to the first function execution device by the first user.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1A and FIG. 1B of FIG. 1 are a diagram illustrating a configuration of a communication system;

FIG. 3A and FIG. 3B of FIG. 3 are a sequence diagram illustrating a case A where two codes are input to two multi-function peripherals;

FIG. 5A and FIG. 5B of FIG. 5 are a sequence diagram following FIG. 3;

FIG. 6A and FIG. 6B of FIG. 6 are a sequence diagram illustrating a case B where the input code is already used;

FIG. 7A and FIG. 7B of FIG. 7 are a sequence diagram illustrating a case C where the number of times of execution of a function increments; and

DETAILED DESCRIPTION

Exemplary Embodiments

Figure 1B:
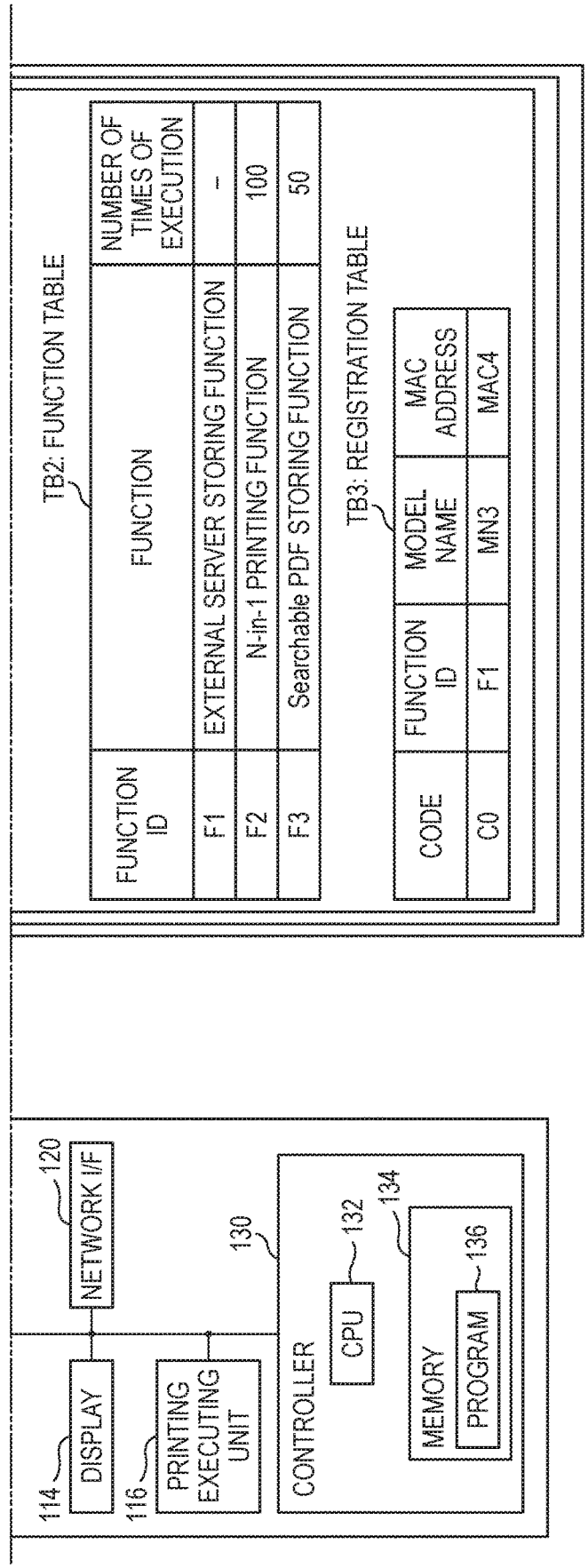

Configuration of Communication System 2; FIG. 1

As illustrated in FIG. 1, the communication system 2 includes plural multi-function peripherals (hereinafter, referred to as "MFP") 100, 200, and 300, a terminal device 400, an electronic commerce (EC) server 500, and a management server 600. The devices 100, 200, 300, and 400 are connected to a wireless local area network (LAN) which is formed by an access point (AP) 350. The devices 100, 200, 300, and 400 can communicate with each other through the AP 350.

The EC server 500 and the management server 600 are provided on an internet 4. The devices 100, 200, 300, and 400 can communicate with the servers 500 and 600 on the internet 4 through the AP 350.

Configuration of MFPs 100, 200, and 300

The MFPs 100, 200, and 300 are peripheral devices (that is, peripheral devices of the terminal device 400 and the like) that can execute multiple functions including a printing function and a scanning function. A model name MN1 and a MAC address MAC1 are assigned to the MFP 100. A model name MN2 and a MAC address MAC2, which are different from those of the MFP 100, are assigned to the MFP 200. The model name MN1, which is the same as that of the MFP 100, and a MAC address MAC5 are assigned to the MFP 300. The MFPs 100, 200, and 300 may be used by the same user or by different users.

The MFP 100 includes an operation unit 112, a display 114, a printing executing unit 116, a scanning executing unit 118, a network interface 120, and a controller 130. The respective units 112 to 130 are connected to a bus line (reference numeral is not illustrated). Hereinafter, the interface will also be referred to as "I/F".

The operation unit 112 includes plural keys. The user can input various instructions to the MFP 100 by operating the operation unit 112. The display 114 is a display for displaying various kinds of information. The display 114 also functions as a so-called touch panel. That is, the display 114 also functions as an operation unit that is operated by the user. Hereinafter, the operation unit 112 and the operation that is realized by the display 114 will be collectively referred to as "operation unit 112". The printing executing unit 116 is an ink jet type or a laser type printing mechanism. The scanning executing unit 118 is a scanning mechanism such as a CCD or a CIS. The network I/F 120 is connected to the internet 4 through the AP 350.

The controller 130 includes a CPU 132 and a memory 134. The CPU 132 is a processor that executes various processes according to a program 136 stored in the memory 134. The memory 134 is configured as, for example, a RAM or a ROM. Although not illustrated in the drawings, the MFPs 200 and 300 have the same configuration as that of the MFP 100.

Configuration of Terminal Device 400

The terminal device 400 is a user terminal such as a desktop personal computer (PC), a laptop PC, or a portable terminal.

Configuration of EC Server 500

The EC server 500 is a server that is provided on the internet 4 by a provider, which is different from a vendor of the MFPs 100, 200, and 300, and executes electronic commercial transactions for providing various functions to the MFP 100 in response to an instruction from the user. In order to give the user a right to enable respective functions of the MFP 100, the vendor of the MFP 100 and the like registers sales information for selling the right in the EC server 500 in advance. The sales information include respective character strings indicating respective functions, respective function IDs for identifying the respective functions, and unit prices of the respective functions.

Configuration of Management Server 600

The management server 600 is a server that is provided on the internet 4 by the vendor of the MFPs 100, 200, and 300 and manages the functions of the MFPs 100, 200, and 300. The management server 600 includes a network I/F 620 and a controller 630. The network I/F 620 is connected to the internet 4.

The controller 630 includes a CPU 632 and a memory 634. The CPU 632 is a processor that executes various processes according to a program 636 stored in the memory 634. The memory 634 is configured as, for example, a RAM, a ROM, or a hard disk. The memory 634 stores not only the program 636 but also a support table TB1, a function table TB2, and a registration table TB3.

The support table TB1 stores each of plural model names of the MFPs and a character string indicating a function, which is executable by an MFP having the model name, in association with each other. Specifically, the support table TB1 stores the model name MN1, a character string "external server storing function", a character string "N-in-1 printing function", and a character string "searchable PDF storing function" in association with each other. The support table TB1 stores the model name MN2 and a character string "external server storing function". The external server storing function is a function of storing scan data, which is generated by an MFP, in a specific external server on the internet 4. The N-in-1 printing function is a function of printing N pages (N represents an integer of 2 or more) of images on one printing medium. The searchable PDF storing function is a function of storing scan data having a searchable PDF format on the internet 4. The respective functions are classified into an on-line function that is executable in a state where an MFP is connected to the internet 4 and an off-line function that is executable even in a state where an MFP is not connected to the internet 4. The external server storing function and the searchable PDF storing function are on-line functions, and the N-in-1 printing function is an off-line function.

The function table TB2 stores a function ID for identifying each of the functions and a character string indicating the function in association with each other. In a case where a function has a limitation in the number of times of execution, the function table TB2 further stores the number of times of execution of the function allowed in an MFP. Specifically, the function table TB2 stores a function ID "F1" and a character string "external server storing function" in association with each other, stores a function ID "F2", a character string "N-in-1 printing function", and a number of times of execution "100" in association with each other, and stores a function ID "F3", a character string "searchable PDF storing function", and a number of times of execution "50" in association with each other. That is, the external server storing function has no limitation in the number of times of execution, and the N-in-1 printing function and the searchable PDF storing function have a limitation in the number of times of execution.

The registration table TB3 is a table for registering a function of which enabling is completed in an MFP. The registration table TB3 stores a code that is generated by the management server 600, a function ID for identifying a function of which enabling is completed, a model name of an MFP having the function of which enabling is completed, a MAC address of the MFP in association with each other.

Processes Executed by Respective Devices 100 to 600; FIGS. 2 to 8

Processes executed by the device 100 and the like will be described with reference to FIGS. 2 to 8. Hereinafter, for convenience of understanding, a process which is executed by the CPU 132 of the MFP 100 according to the program 136 will be described mainly focusing not on the CPU 132 but on the MFP 100. In addition, all the communications executed by the MFP 100 are made through the network I/F 120. Therefore, in the description of the communications, the expression "through the network I/F 120" will be omitted. Likewise, the management server 600 will be mainly described, and the expression "through the network I/F 620" will be omitted.

Figure 2:
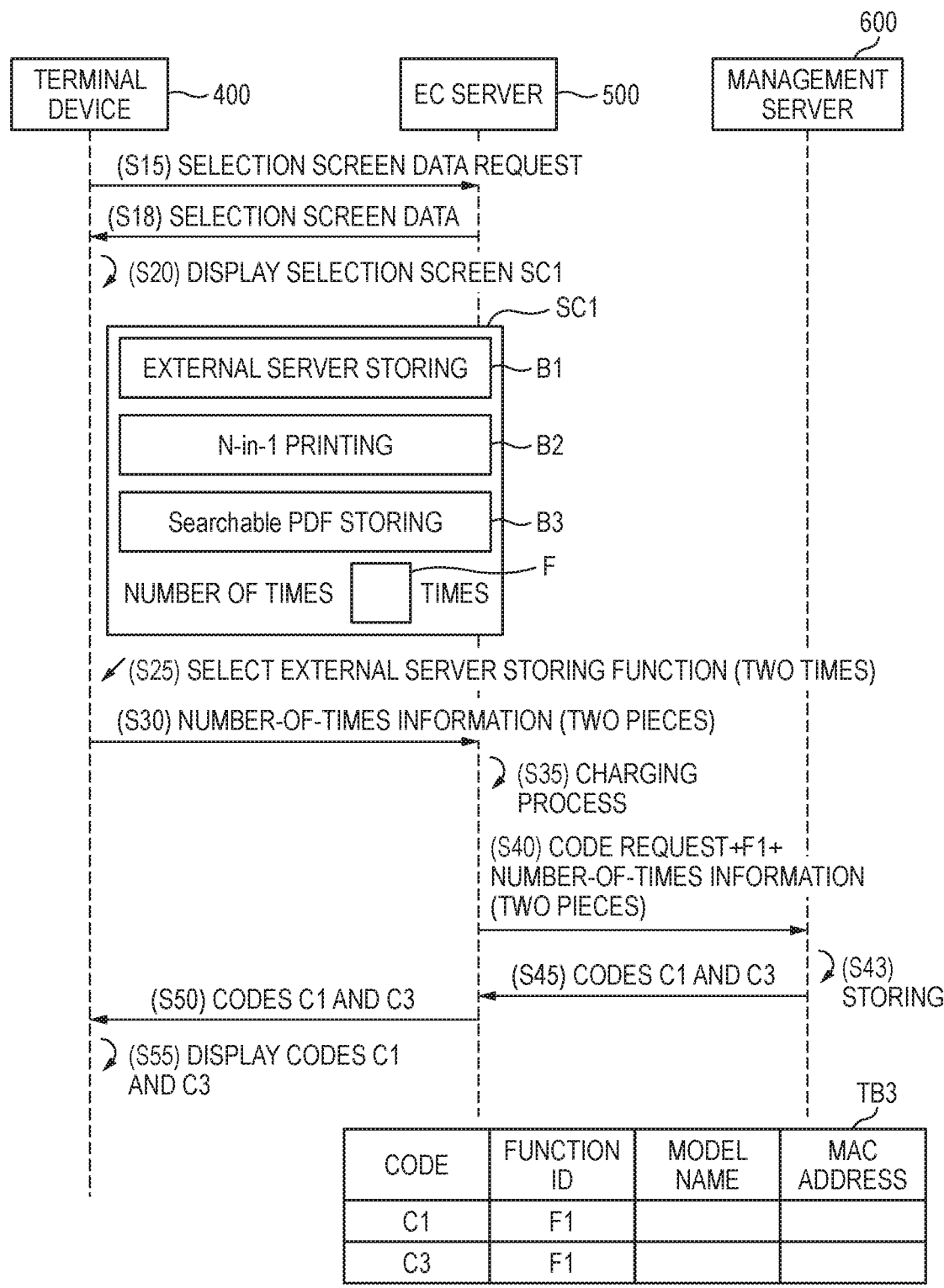
FIG. 2 is a sequence diagram illustrating a state where a code is transmitted to a terminal device.

Transmission of Code to Terminal Device 400; FIG. 2

In an initial state of FIG. 2, the user is logged into the EC server 500 by inputting account information to the terminal device 400. In a case where a predetermined operation is executed by the user in the terminal device 400, the terminal device 400 transmits a selection screen data request to the EC server 500 in S15, and transmits selection screen data from the EC server 500 to the terminal device 400 in S18, the selection screen data including the respective character strings of the respective functions (that is, the external server storing function, the N-in-1 printing function, and the searchable PDF storing function) and the respective function IDs "F1" to "F3" corresponding to the respective functions.

In a case where the selection screen data is received from the EC server 500, in S20, the terminal device 400 displays a selection screen SC1 based on the selection screen data. The selection screen SC1 includes a button B1 that indicates the external server storing function, a button B2 that indicates the N-in-1 printing function, and a button B3 that indicates the searchable PDF storing function, and an input form F for inputting the number of times of execution.

In S25, the user selects the button B1 indicating the external server storing function, and inputs 2 to the input form F on the selection screen SC1. In this case, in S30, the terminal device 400 transmits the function ID "F1" corresponding to the external server storing function, and number-of-times information "2" to the EC server 500.

In a case where the function ID "F1" and the number-of-times information "2" are received from the terminal device 400, in S35, the EC server 500 determines a total price by multiplying a unit price of the external server storing function corresponding to the function ID "F1" by the number-of-times information "2", and executes a charging process of charging the user with the determined total price. Next, in S40, the EC server 500 transmits a code request, the function ID "F1", the number-of-times information "2" to the management server 600.

In a case where the code request, the function ID "F1", and the number-of-times information "2" are received from the EC server 500, in S43, the management server 600 generates two different codes C1 and C3 corresponding to the number indicated by the number-of-times information "2". The management server 600 further stores the code C1 and the function ID "F1" in the registration table TB3 in association with each other, and stores the code C3 and the function ID "F1" in the registration table TB3 in association with each other. Next, in S45, the management server 600 transmits the codes C1 and C3 to the EC server 500.

In a case where the codes C1 and C3 are received from the management server 600, in S50, the EC server 500 transmits the codes C1 and C3 to the terminal device 400.

In a case where the codes C1 and C3 are received from the EC server 500, in S55, the terminal device 400 displays the codes C1 and C3. As a result, the user can purchase a right to enable the external server storing function and can learn the codes C1 and C3 for executing the right.

Figure 3B:
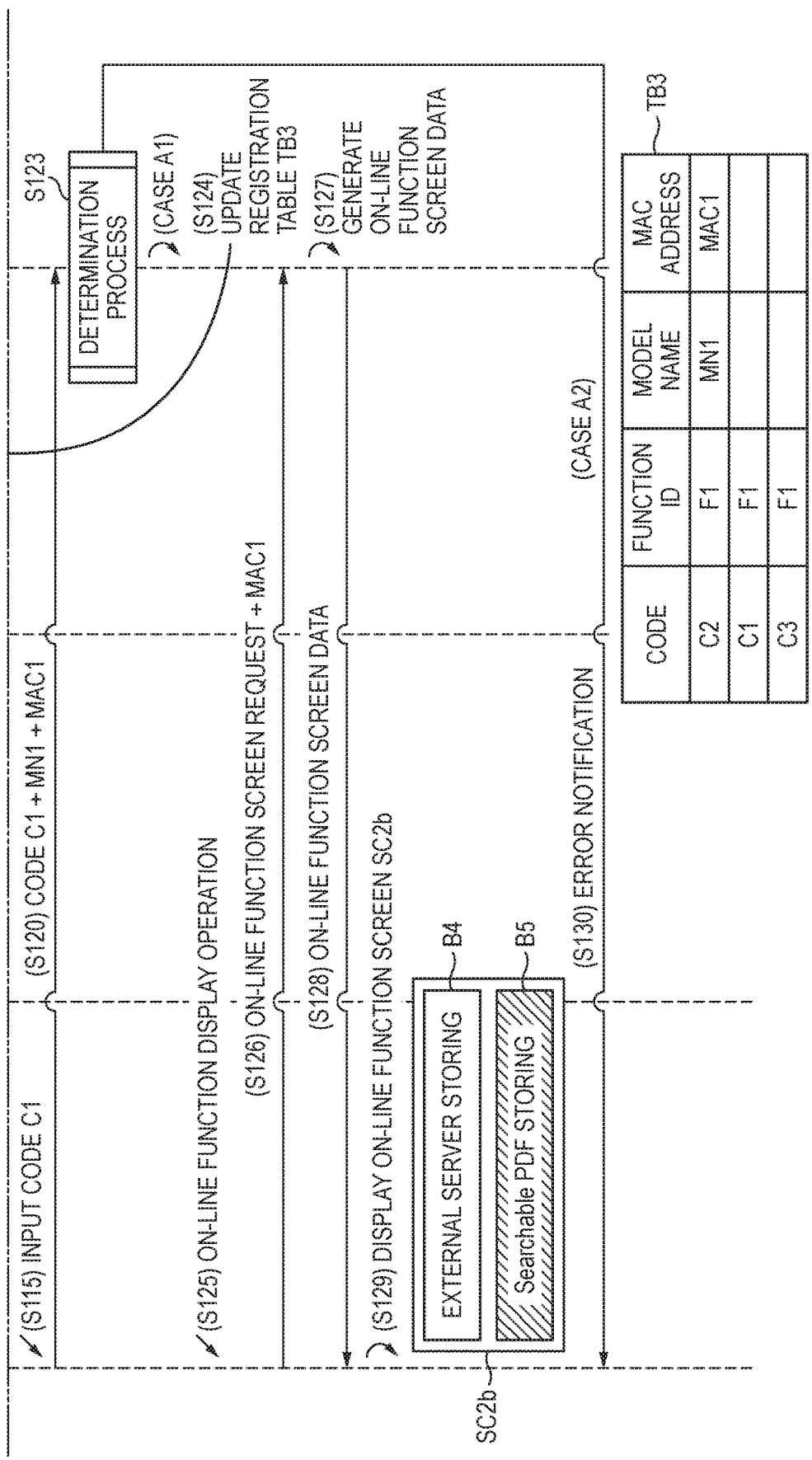

Case A; FIG. 3

Next, a case A which is executed after executing the respective processes of FIG. 2 will be described with reference to FIG. 3. In the case A, the code C1 is input to the MFP 100, and the code C3 is input to the MFP 300 which is different from the MFP 100.

In S102, the user executes an on-line function display operation using the operation unit 112. In this case, in S104, the MFP 100 transmits an on-line function screen request and the MAC address MAC1 to the management server 600.

In a case where the on-line function screen request and the MAC address MAC1 are received from the MFP 100, in S105, the management server 600 generates on-line function screen data corresponding to the received MAC address MAC1. Specifically, the management server 600 verifies that the functions IDs "F1" and "F3" are not associated with the MAC address MAC1 in the registration table TB3, that is, the external server storing function and the searchable PDF storing function are not enabled in the MFP 100, and then generates on-line function screen data indicating that the functions are not executable. In S106, the management server 600 transmits the on-line function screen data to the MFP 100.

In a case where the on-line function screen data is received from the management server 600, in S108, the MFP 100 displays an on-line function screen SC2a on the display 114 based on the on-line function screen data. The on-line function screen SC2a includes a button B4 for executing the external server storing function and a button B5 for executing the searchable PDF storing function. However, the buttons B4 and B5 are grayed out, and the MFP 100 does not receive the operations of the buttons B4 and B5.

In S109, the user executes a menu display operation using the operation unit 112. In this case, in S110, the MFP 100 displays a menu screen SC3 on the display 114 based on menu screen data that is stored in the memory 134 in advance. The menu screen SC3 includes a function enabling button B6 for enabling a function. In a modification example, in S110, the MFP 100 may transmit a menu screen data request to the management server 600, receive menu screen data from the management server 600, and display the menu screen data SC3 on the display 114 based on the menu screen data.

In S113, the user executes an operation of selecting the function enabling button B6 in the menu screen SC3 using the operation unit 112. In this case, in S114, the MFP 100 displays an input screen (not illustrated) for inputting a code on the display 114. In S115, the user inputs the code C1, which is displayed in S55 of FIG. 2, to the input screen. In this case, in S120, the MFP 100 transmits the input code C1, the model name MN1 of the MFP 100, and the MAC address MAC1 to the management server 600.

Figure 4:
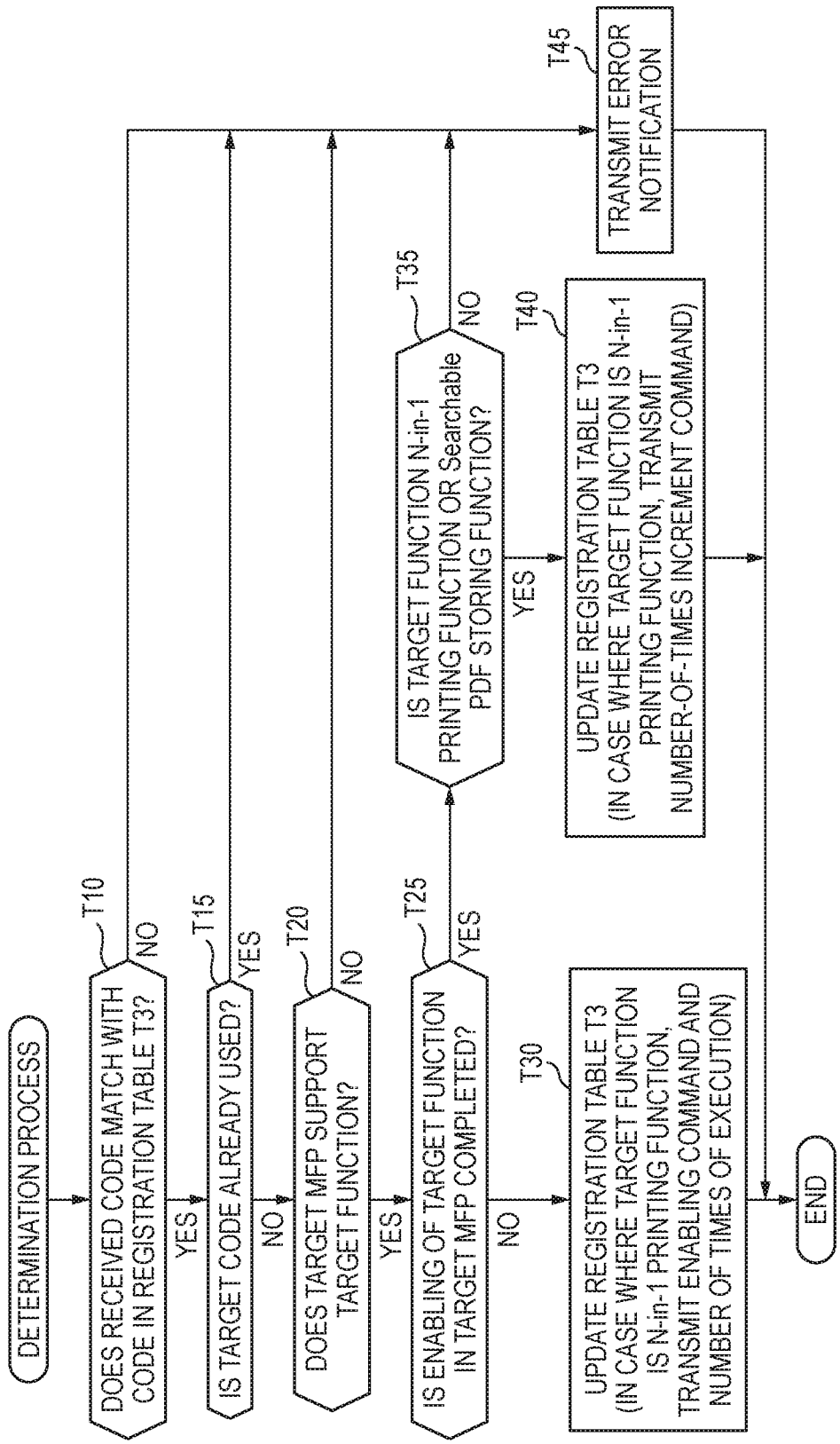
FIG. 4 is a flowchart illustrating a determination process.

In a case where the code C1, the model name MN1, and the MAC address MAC1 are received from the MFP 100, in S123, the management server 600 executes a determination process (refer to FIG. 4).

Determination Process: FIG. 4

The details of the determination process in S123 of FIG. 3 will be described with reference to FIG. 4. The management server 600 executes the process illustrated in FIG. 4 in response to reception of a code, a model name, and an MAC address from any one of the MFP 100 and the like. Hereinafter, the MFP from which the code and the like are transmitted will be referred to as "target MFP".

In T10, the management server 600 determines whether or not the received code matches with any one of the codes in the registration table TB3. In a case where the management server 600 determines that the received code matches with any one of the codes in the registration table TB3, the answer of T10 is YES, and the process proceeds to T15. In a case where the management server 600 determines that the received code does not match with any one of the codes in the registration table TB3, the answer of T10 is NO, and the process proceeds to T45. Hereinafter, the code in the registration table TB3 that matches with the received code will be referred to as "target code", and a function ID that is associated with the target code will be referred to as "target function ID".

In T15, the management server 600 determines whether or not the target code is already used. Specifically, the management server 600 determines whether or not a model name and a MAC address are associated with the target code and the target function ID in the registration table TB3. In a case where the management server 600 determines that a model name and a MAC address are associated with the target code and the target function ID, the answer of T15 is YES, and the process proceeds to T45. In a case where the management server 600 determines that a model name and a MAC address are not associated with the target code and the target function ID, the answer of T15 is NO, and the process proceeds to T20.

In T20, the management server 600 determines whether or not the target MFP supports a function (hereinafter, referred to as "target function") that is identified by the target function ID (whether or not the function is executable). Specifically, the management server 600 determines whether or not a character string (hereinafter, referred to as "target character string") indicating each function in the support table TB1, which is associated with the received model name, indicates the target function. In a case where the management server 600 determines that the target character string indicates the target function, the answer of T20 is YES, and the process proceeds to T25. In a case where the management server 600 determines that the target character string does not indicate the target function, the answer of T20 is NO, and the process proceeds to T45.

In T25, the management server 600 determines whether or not enabling of the target function in the target MFP is completed. Specifically, the management server 600 determines whether or not the received model name and the received MAC address are associated with the target function ID and a code different from the target code in the registration table TB3. In a case where the management server 600 determines that the received model name and the received MAC address are associated with the target function ID and a code different from the target code, the answer of T25 is YES, and the process proceeds to T35. In a case where the management server 600 determines that the received model name and the received MAC address are not associated with the target function ID and a code different from the target code, the answer of T25 is NO, and the process proceeds to T30.

In T30, the management server 600 updates the registration table TB3. Specifically, the management server 600 stores the received model name and the received MAC address in the registration table TB3 in association with the target code and the target function ID. In a case where the target function is an on-line function (that is, the external server storing function or the searchable PDF storing function), the management server 600 updates the registration table TB3, and the process of FIG. 4 ends. On the other hand, in a case where the target function is an off-line function (that is, the N-in-1 printing function), the management server 600 further transmits an enabling command and a number of times of execution to the target MFP. The enabling command is a command for changing a setting that prevents execution of the N-in-1 printing function to a setting that allows executing of the N-in-1 printing function in the target MFP including a program for executing the N-in-1 printing function. The number of times of execution is the number of times of execution "100" that is associated with the function ID "F2" for identifying the N-in-1 printing function in the function table TB2. In a case where T30 ends, the management server 600 ends the process of FIG. 4.

In T35, the management server 600 determines whether or not the target function is a function having a limitation in the number of times of execution (that is, the N-in-1 printing function or the searchable PDF storing function). In a case where the management server 600 determines that the target function is the N-in-1 printing function or the searchable PDF storing function, the answer of T35 is YES, and the process proceeds to T40. In a case where the management server 600 determines that the target function is the external server storing function, the answer of T35 is NO, and the process proceeds to T45.

In T40, the management server 600 updates the registration table TB3 as in T30. In a case where the target function is the searchable PDF storing function, the management server 600 updates the registration table TB3, and the process of FIG. 4 ends. On the other hand, in a case where the target function is the N-in-1 printing function, the management server 600 further transmits a number-of-times increment command to the target MFP. The number-of-times increment command is a command for incrementing the number of times of execution of the N-in-1 printing function allowed in the target MFP by "100". In a case where T40 ends, the management server 600 ends the process of FIG. 4.

In T45, the management server 600 transmits an error notification to the target MFP, the error notification indicating that enabling of the target function in the target MFP fails. In this case, the management server 600 does not execute a process of enabling the target function (that is, the processes of T30 and T40). Therefore, in a case where the received code is not appropriate (that is, the answer of T10 or T15 is NO), a case where the target MFP does not support the target function (that is, the answer of T20 is NO), or a case where the external server storing function as the target function is already enabled in the target MFP (that is, the answer of T35 is NO), it is not necessary that the management server 600 executes the process of enabling the target function. In a case where T45 ends, the management server 600 ends the process of FIG. 4.

Continuation of Case A; FIG. 3

Returning to FIG. 3, the determination process of S123 will be continuously described. In a case A1, the codes C1 and C3 and the function ID "F1" are stored in the registration table TB3 as illustrated in S43 of FIG. 2.

In the case A1, in the determination process of S123, the management server 600 determines that the received code C1 matches with the code C1 (that is, the target code) in the registration table TB3 (the answer of T10 of FIG. 4 is YES), determines that the target code C1 is not used (the answer of T15 is NO), determines that the MFP 100 supports the external server storing function (the answer of T20 is YES), and determines that enabling of the external server storing function is not completed in the MFP 100 (the answer of T25 is NO). Accordingly, in S124, the management server 600 stores the model name MN1 and the MAC address MAC1 in the registration table TB3 in association with the code C1 and the function ID "F1" (T30).

S125 and S126 which are executed after S124 are the same as S102 and S104. In S127, the management server 600 generates on-line function screen data indicating that the function ID "F1" is associated with the MAC address MAC1 but the function ID "F3" is not associated with the MAC address MAC1 in the registration table TB3, that is, indicating that, in the MFP 100, the external server storing function is enabled, the searchable PDF storing function is not enabled, the external server storing function is executable, and the searchable PDF storing function is not executable. S128 is the same as S106.

In S129, the MFP 100 displays an on-line function screen SC2b on the display 114 based on the on-line function screen data. In the on-line function screen SC2b, the button B4 for executing the external server storing function is not grayed out, and the button B5 for executing the searchable PDF storing function is grayed out. That is, the MFP 100 can receive the operation of the button B4 and, in a case where the operation is received, can transmit and store scan data in an external server. This way, in the MFP 100, the setting (states of S102 to S108) that prevents execution of the external server storing function is changed to the setting (states of S125 to S129) that allows execution of the external server storing function.

Continuation of Case A1; FIG. 5

Next, the case A1 will be continuously described with reference to FIG. 5. FIG. 5 illustrates a case where the external server storing function is enabled in the MFP 300 different from the MFP 100. S139 to S153 are the same as S109 to S123 except that: the MFP 300 is used as the process execution subject instead of the MFP 100; and the code C3 and the MAC address MAC3 are used instead of the code C1 and the MAC address MAC1.

In S165, the management server 600 stores the model name MN1 and the MAC address MAC3 in the registration table TB3 in association with the code C3 and the function ID "F1" (T30 of FIG. 4). S166 to S169 are the same as S125 to S129 except that the MFP 300 is used as the process execution subject instead of the MFP 100. As a result, in the MFP 300, the setting that prevents execution of the external server storing function is changed to the setting that allows execution of the external server storing function.

Effect of Case A1

According to the case A1, in a case where the function ID "F1" and the number-of-times information "2" are received from the EC server 500 (S40 of FIG. 2), the management server 600 stores the function ID "F1" and the two codes C1 and C3 in the memory 634 in association with each other (S43), and transmits the two codes C1 and C3 to the EC server 500 (S45). In a case where the code C1 is input to the MFP 100 by the user (S115 of FIG. 3) and the code C1 is received from the MFP 100 (S120), the management server 600 enables the external server storing function in the MFP 100 (S124). The user inputs the code C1 to the MFP 100 and thus can appropriately select the MFP 100 in which the external server storing function should be enabled. Likewise, in the case of FIG. 5, the user inputs the code C3 to the MFP 300 and thus can appropriately select the MFP 300 in which the external server storing function should be enabled. In particular, the management server 600 transmits the two codes C1 and C3, which correspond to the amount (that is, two) selected by the user in S25 of FIG. 2, to the terminal device 400 through the EC server 500 (S45). Therefore, the same function (that is, the external server storing function) can be enabled in the two MFPs 100 and 300.

Correspondence of Case A1

The management server 600, the EC server 500, the MFP 100, and the MFP 300 are examples of "server", "specific device", "first function execution device", and "third function execution device", respectively. The external server storing function and the function ID are examples of "first function" and "first function information", respectively. The two codes C1 and C3 are an example of "N pieces of authentication information". The code C1 and the code C3 are examples of "first authentication information" and "third authentication information", respectively. The model names MN1 and MN2 in the support table TB1 are an example of "a plurality of model names". The model name MN1 is an example of "target model name". The character string indicating each function in the support table TB1 is an example of "executable function information". The character string indicating the external server storing function is an example of "target executable function information". S40, S43, and S45 of FIG. 2, S120 of FIG. 3, and T20 of FIG. 4 are examples of processes which are executed by "function information receiver", "storage controller", "authentication information transmitter", "authentication information receiver", and "second determining unit" of "server", respectively. S124 of FIG. 3 and T30 of FIG. 4 are an example of processes which are executed by "enabling executing unit" of "server". S120 of FIG. 3 is an example of a process which is executed by "transmitter" of "first function execution device".

Case A2; FIG. 3

A case A2 which is executed after the determination process of S123 will be described with reference to FIG. 3. In the case A2, when the determination process of S123 is executed, the code C2, the function ID "F1", the model name MN1, and the MAC address MAC1 are associated with each other in the registration table TB3. That is, when the determination process of S123 is executed, enabling of the external server storing function is completed in the MFP 100. For example, before executing S25 of FIG. 2 to S123 of FIG. 3, the user selects the button B1 corresponding to the external server storing function on the selection screen SC1 and inputs "1" to the input form F. As a result, the code C2 and the function ID "F1" are stored in the registration table TB3 in association with each other, and the terminal device 400 receives the code C2 from the EC server 500. In a case where the code 2 is input to the MFP 100 by the user, the management server 600 receives the code C2, the model name MN1, and the MAC address MAC1 from the MFP 100. As a result, the model name MN1 and the MAC address MAC1 are stored in the registration table TB3 in association with the code C2 and the function ID "F1", and the external server storing function is enabled in the MFP 100.

In the case A2, in the determination process of S123, the management server 600 determines that the received code C1 matches with the code C1 (that is, the target code C1) in the registration table TB3 (the answer of T10 of FIG. 4 is YES), determines that the target code C1 is not used (the answer of T15 is NO), determines that the MFP 100 supports the external server storing function as the target function (the answer of T20 is YES), determines that the external server storing function is enabled in the MFP 100 (the answer of T25 is YES), and determines that the target function is not the N-in-1 printing function and the searchable PDF storing function (the answer of T35 is NO). Therefore, in S130, the management server 600 transmits an error notification to the MFP 100 (T45).

Effect of Case A2

In a state where enabling of the external server storing function is completed in the MFP 100, the management server 600 does not execute a process of enabling the external server storing function in the MFP 100. Accordingly, the external server storing function can be prevented from being redundantly enabled in the MFP 100. That is, even in a case where the external server storing function is enabled using the code C2 in the MFP 100, another code C1 can be prevented from being used.

Correspondence of Case A2

The MAC address MAC1 is an example of "device information". The model name MN1 and the MAC address MAC1 in the registration table TB3 are an example of "second completion information". The code C2 is an example of "second authentication information". T25 of FIG. 4 is an example of a process which is executed by "third determining unit" of "server".

Figure 6B:
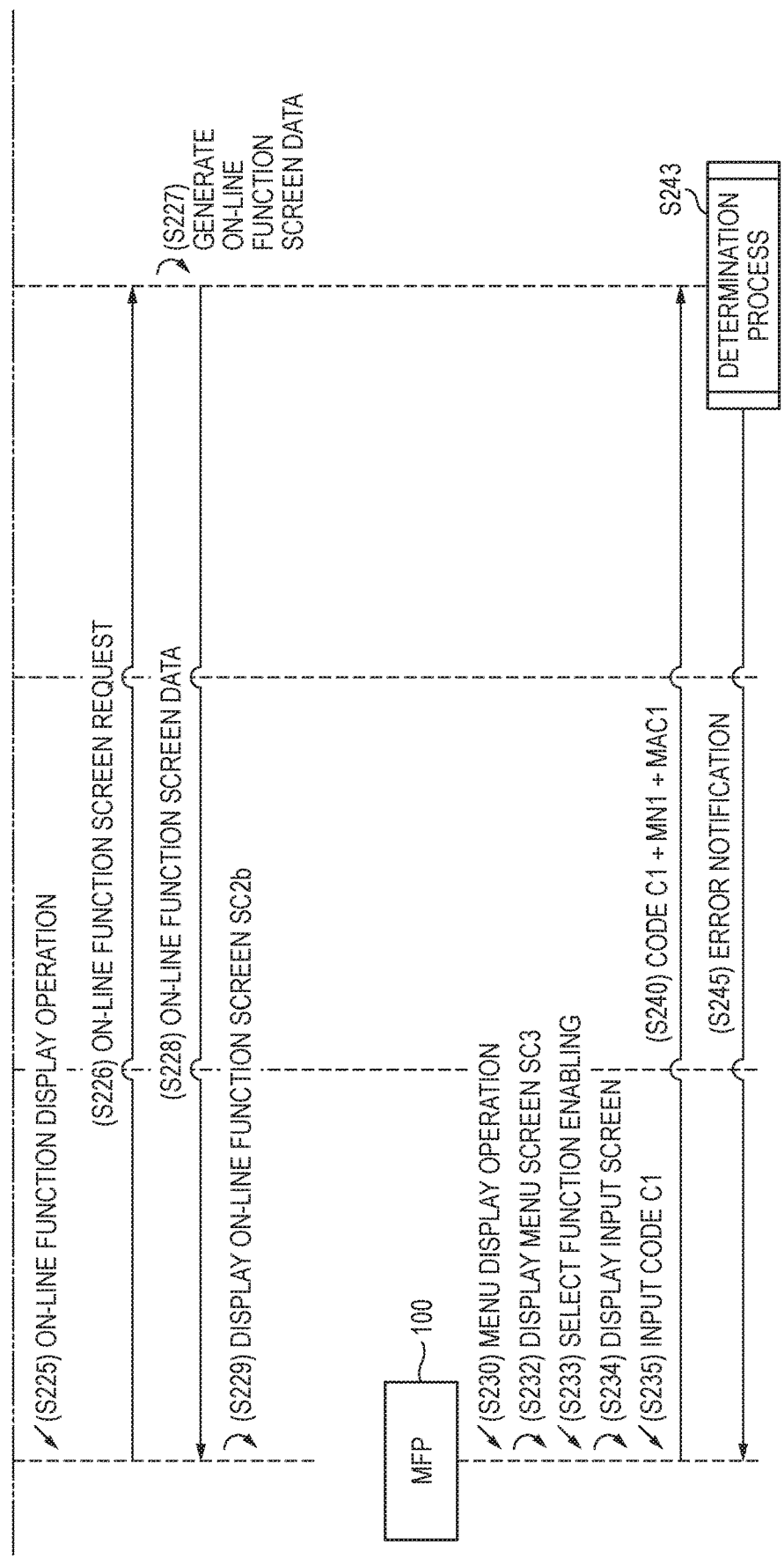

Case B; FIG. 6

A case B which is executed after executing the respective processes of FIG. 2 will be described with reference to FIG. 6. In the case B, the code C1 is input to the MFP 200, and then the same code C1 is input to the MFP 100 which is different from the MFP 200.

S209 to S215 are the same as S109 to S115 of FIG. 3 except that the MFP 200 is used as the process execution subject instead of the MFP 100. In S220, the MFP 200 transmits the input code C1, the model name MN2 of the MFP 200, and the MAC address MAC2 to the management server 600.

In a case where the code C1, the model name MN2, and the MAC address MAC2 are received from the MFP 200, in S223, the management server 600 executes the determination process (refer to FIG. 4). As a result, in S224, the management server 600 stores the model name MN2 and the MAC address MAC2 in the registration table TB3 in association with the code C1 and the function ID "F1" (T30 of FIG. 4). S225 to S229 are the same as S125 to S129 of FIG. 3 except that the MFP 200 is used as the process execution subject instead of the MFP 100.

S230 to S243 are the same as S109 to S123 of FIG. 3. In the determination process of S243, the management server 600 determines that the received code C1 matches with the code C1 (that is, the target code C1) in the registration table TB3 (the answer of T10 of FIG. 4 is YES), and determines that the target code C1 is already used (the answer of T15 is YES). Therefore, in S245, the management server 600 transmits an error notification to the MFP 200 (T45).

Effect of Case B

As described in the case B, after enabling the external server storing function in the MFP 200 using the code C1, the management server 600 does not enable the external server storing function in the MFP 100 using the same code C1. Accordingly, even in a case where the user purchases only one right to enable the external server storing function, the external server storing function can be prevented from being enabled in two or more MFPs 100 and 200.

Correspondence of Case B

The MFP 200 is an example of "second function execution device". The model name MN2 and the MAC address MAC2 stored in the registration table TB3 in S224 are an example of "first completion information". T15 of FIG. 4 is an example of a process which is executed by "first determining unit" of "server".

Figure 7B:
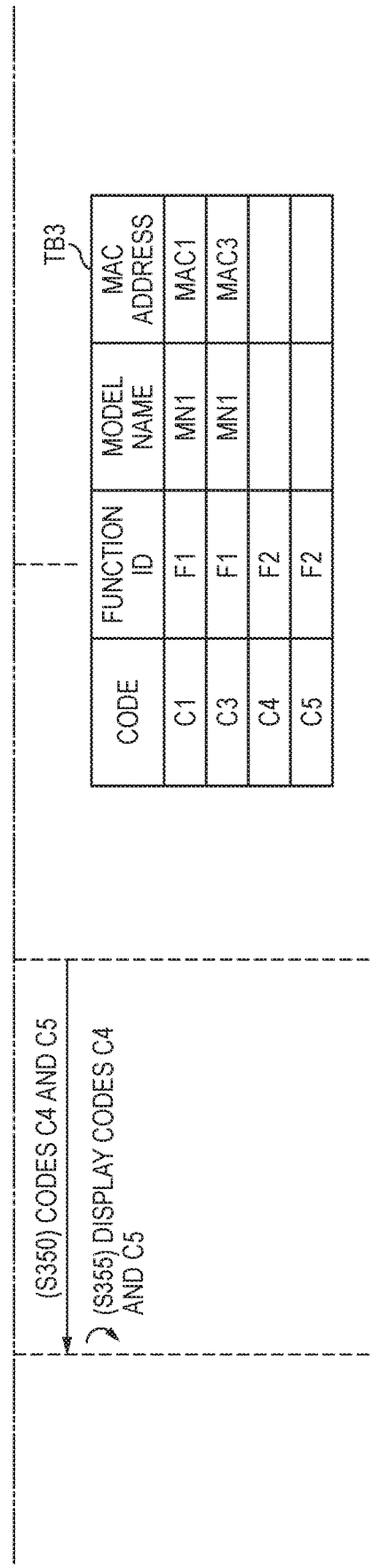
Figure 8B:
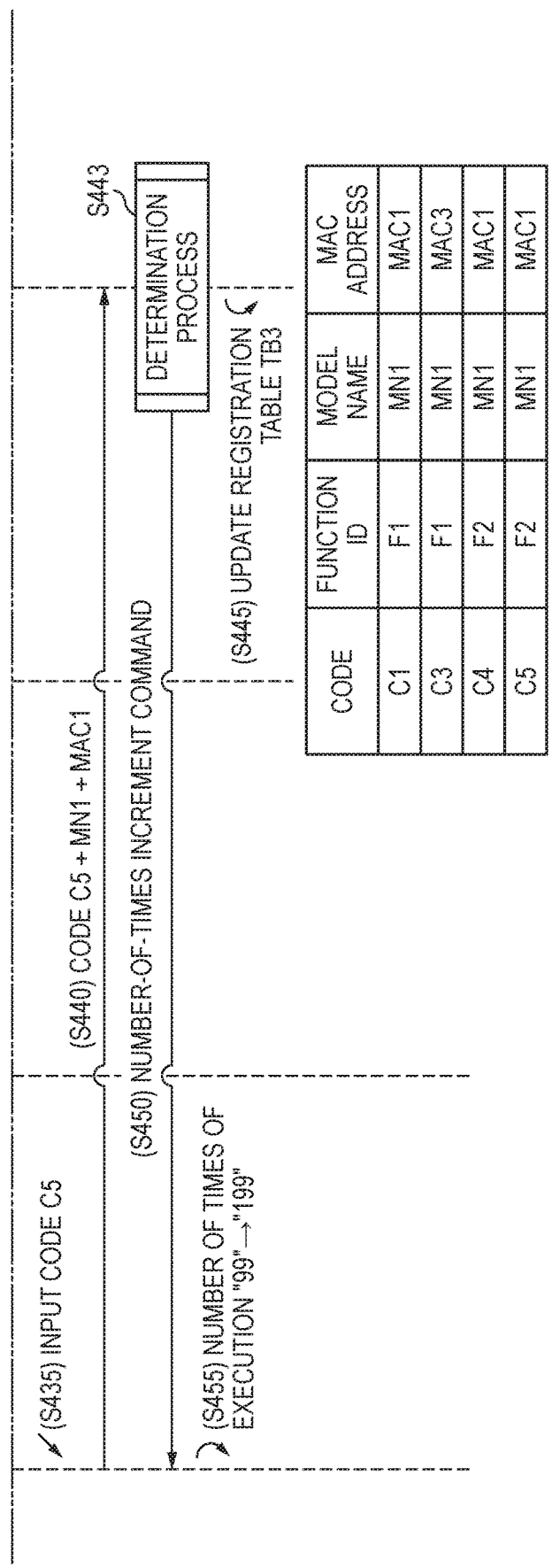

Case C; FIGS. 7 and 8

A case C which is executed after the case A1 of FIG. 5 will be described with reference to FIGS. 7 and 8. The case C is a case where the number of times of execution of the searchable PDF storing function increments. S315 to S320 are the same as S15 to S20 of FIG. 2.

In S325, the user selects the button B2 indicating the N-in-1 printing function on the selection screen SC1, and inputs "2" to the input form F. S330 to S340 are the same as S30 to S40 of FIG. 2 except that the function ID "F2" is used instead of the function ID "F1".

In S343, the management server 600 generates two codes C4 and C5 corresponding to the number of times "2" based on the number-of-times information, stores the code C4 and the function ID "F2" in the registration table TB3 in association with each other, and stores the code C5 and the function ID "F" in the registration table TB3 in association with each other. S345 to S355 are the same as S45 to S55 of FIG. 2 except that the codes C4 and C5 are used instead of the codes C1 and C3.

In S402 of FIG. 8, the user executes a printing operation of executing printing in the MFP 100 using the terminal device 400. The printing operation includes an operation of selecting printing data indicating an image of a printing target, and an operation of selecting printing conditions indicating 2in1 printing. In S404, the terminal device 400 transmits the printing data and the printing conditions to the MFP 100.

In a case where the printing data and the printing conditions are received from the terminal device 400, the MFP 100 determines that a N-in-1 printing flag (not illustrated) in the memory 134 is OFF. The N-in-1 printing flag is information indicating whether or not the N-in-1 printing function is enabled in the MFP 100, and is set to OFF in the initial state. ON of the N-in-1 printing flag represents that the N-in-1 printing function is enabled in the MFP 100, and OFF of the N-in-1 printing flag represents that the N-in-1 printing function is not enabled in the MFP 100. Once it is determined that the N-in-1 printing flag is OFF, in S406, the MFP 100 displays an error screen on the display 114, the error screen indicating that the N-in-1 printing fails.

Next, the same processes and operations as those of S109 to S114 of FIG. 3 are executed. In S415, the user inputs the code C4 to the input screen. In this case, in S420, the MFP 100 transmits the input code C4, the model name MN1 of the MFP 100, and the MAC address MAC1 to the management server 600.

In a case where the code C4, the model name MN1, and the MAC address MAC1 are received from the MFP 100, in S423, the management server 600 executes the determination process. In the determination process of S423, the management server 600 determines that the received code C4 matches with the code C4 (that is, the target code C4) in the registration table TB3 (the answer of T10 of FIG. 4 is YES), determines that the target code C4 is not used (the answer of T15 is NO), determines that the MFP 100 supports the N-in-1 printing function as the target function (the answer of T20 is YES), and determines that enabling of the N-in-1 printing function is not completed in the MFP 100 (the answer of T25 is NO). Therefore, the management server 600 stores the model name MN1 and the MAC address MAC1 in the registration table TB3 in association with the code C4 and the function ID "F" in S425, and transmits the enabling command and the number of times of execution "100" to the MFP 100 in S426 (T30).

In a case where the enabling command and the number of times of execution "100" are received from the management server 600, in S428, the MFP 100 changes the N-in-1 printing flag from OFF to ON and stores the number of times of execution "100". As a result, in the MFP 100, the N-in-1 printing function is enabled, and 100 times is stored as the limitation of the number of times of execution of the N-in-1 printing function.

S430 and S432 are the same as S402 and S404. Once it is determined that the N-in-1 printing flag is ON in S433, the MFP 100 executes 2in1 printing according to the printing data in S434. In S455, the MFP 100 rewrites the number of times of execution as "99" by decrementing the stored number of times of execution "100" by "1".

In S435, the user inputs the code C5 to the input screen. In S440, the MFP 100 transmits the input code C5, the model name MN1 of the MFP 100, and the MAC address MAC1 to the management server 600.

In S443, the management server 600 executes the determination process of FIG. 4. In the determination process of S443, the management server 600 determines that the received code C5 matches with the code C5 (that is, the target code C5) in the registration table TB3 (the answer of T10 of FIG. 4 is YES), determines that the target code C5 is not used (the answer of T15 is NO), determines that the MFP 100 supports the N-in-1 printing function as the target function (the answer of T20 is YES), determines that enabling of the N-in-1 printing function is completed in the MFP 100 (the answer of T25 is YES), and determines that the target function is the N-in-1 printing function (the answer of T35 is YES). Therefore, the management server 600 stores the model name MN1 and the MAC address MAC1 in the registration table TB3 in association with the code C5 and the function ID "F" in S445, and transmits the number-of-times increment command to the MFP 100 in S450 (T40).

In a case where the number-of-times increment command is received from the management server 600, in S455, the MFP 100 rewrites the number of times of execution as "199" by incrementing the stored number of times of execution "99" by "100".

Effect of Case C

After enabling the external server storing function in the MFP 100 (in S124 of FIG. 3), the management server 600 enables the N-in-1 printing function in the MFP 100 (S425 of FIG. 8). That is, the two functions can be enabled in the MFP 100. In addition, the user can enable different functions in the MFP 100 by executing the same operation (that is, the operation of selecting the function enabling button B6 and inputting the code) in the MFP 100 two times. In addition, in a case where the code C5 for enabling the N-in-1 printing function in the MFP 100 is received (S440) in a state where the N-in-1 printing function is enabled in the MFP 100, the management server 600 can increment the number of times of execution of the N-in-1 printing function allowed in the MFP 100 (S455).

Correspondence of Case C

The N-in-1 printing function and the searchable PDF storing function are examples of "predetermined function". The N-in-1 printing function is an example of "first function" and "second function". The function ID "F" is an example of "first function information" and "second function information". The code C4 is an example of "first authentication information" and "fourth authentication information". The enabling command and the function enabling button B6 are examples of "enabling information" and "predetermined button", respectively. T35 and T40 of FIG. 4 are an example of processes which are executed by "fourth determining unit" and "number-of-times controller" of "server".

Hereinabove, the specific examples of the present invention have been described in detail. However, the specific examples are merely exemplary and do not limit the claims. The technique described in the claims includes various modifications and changes of the specific example described above. Modification examples of the embodiment will be described below.

Modification Example 1

In a modification example, a specific terminal device that is owned by the vendor of the MFPs 100, 200, and 300 may be used instead of the EC server 500. The management server 600 and the specific terminal device belong to the same LAN and can communicate with each other. In the modification example, the following processes are executed instead of S30 to S55 of FIG. 2 and S330 to S355 of FIG. 7. First, the user of the terminal device 400 calls the vendor using a phone number of the specific terminal device, and places an order (that is, a function ID and number-of-times information) to the vendor. The vendor inputs the function ID and the number-of-times information to the specific terminal device. As a result, the management server 600 receives the function ID and the number-of-times information from the specific terminal device, and transmits a code to the specific terminal device. The vendor calls the user using a phone number of the terminal device 400, and notifies the code received from the specific terminal device to the user. That is, "the specific device" may be, for example, the specific terminal device.

Modification Example 2

The order of execution of S43 and S45 of FIG. 2 may be reversed, and the order of execution of S343 and S345 of FIG. 7 may be reversed. That is, the order of executing the storage of "first function information" and "first authentication information" and the transmission of "first authentication information" to the specific device is insignificant.

Modification Example 3

In the embodiment, in a case where the target function is the N-in-1 printing function in T30 of FIG. 4, the management server 600 may transmit a firmware for executing the N-in-1 printing function instead of the enabling command. That is, "first enabling process" may be a process of transmitting the firmware to the first function execution device.

Modification Example 4

In the embodiment, a used code cannot be used again. However, in a modification example, a code may be repeatedly used. In this case, in a case where the answer of T10 in FIG. 4 is YES, the management server 600 does not execute T15, and the process proceeds to T20. That is, "first determining unit" is not necessarily provided.

Modification Example 5

In a modification example, all the MFPs may support all the functions. In this case, in a case where the answer of T15 in FIG. 4 is NO, the management server 600 does not execute T20, and the process proceeds to T25. That is, "second determining unit" is not necessarily provided.

Modification Example 6

In a modification example, in a case where the answer of T20 in FIG. 4 is YES, the management server 600 does not execute T25, and the process proceeds to T30. In the modification example, an MFP can receive the enabling command and the number of times of execution although the N-in-1 printing function is enabled. In this case, the MFP ignores the enabling command and increments the number of times of execution, which is stored in the memory 134, by the received number of times of execution. That is, "third determining unit" is not necessarily provided.

Modification Example 7

In a modification example, the selection screen SC1 may not include the input form F, and the number-of-times information may not be used. In this case, the server 600 may transmit only one code in S45 of FIGS. 2 and S345 of FIG. 7. That is, "function information receiver" may not receive the number-of-times information.

Modification Example 8

On the menu screen SC3 of S110 and the like of FIG. 3, the user selects the function enabling button B6 irrespective of the kind of the function that should be enabled. Instead, in a modification example, the user may select a button corresponding to the function that should be enabled among three buttons corresponding to three kinds of functions (that is, the external server storing function, the N-in-1 printing function, and the searchable PDF storing function). In a case where a button different from a predetermined button is selected, "authentication information receiver" may receive fourth authentication information.

Modification Example 9

"Function execution device" is not limited to an MFP and may be a printer, a scanner, a facsimile machine, or the like.

Modification Example 10

In the embodiment, the respective processes of FIGS. 2 to 8 are realized by the CPUs 132 and 632 of the MFP 100 and the management server 600 executing the programs 136 and 636 (that is, software). Instead, at least one of the respective processes of FIGS. 2 to 8 may be realized by hardware such as a logical circuit or the like.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A non-transitory computer-readable medium having instructions that, when executed by a controller of a server, cause the controller to:
receive, by the server, first function information for identifying a first function from an external server, the external server being different from a first function execution device and the server;
store, by the server, in response to the first function information being received from the external server, the first function information and a first code generated by the server in a memory of the server, in association with each other, the first code being used to enable the first function;
transmit, by the server, in response to the first function information being received from the external server, the first code to the external server;
receive, by the server, the first code from the first function execution device;
determine whether the first code has been used by determining, in response to the first code being received from the first function execution device, whether or not a first completion information is stored in the memory in association with the first function information and the first code, the first completion information representing that a function has been enabled in a second function execution device which is different from the first function execution device, and
execute, by the server, in response to the first code being received from the first function execution device and it being determined that the first completion information is not stored in the memory, a first enabling process for enabling the first function in the first function execution device, wherein the first function is identified by the first function information stored in the memory of the server, in association with the first code,
wherein in response to it being determined that the first completion information is stored in the memory, the first enabling process is not executed.

2. The non-transitory computer-readable medium according to claim 1, wherein the instructions further causes the controller to execute, by the server, in response to the first code being received from the second function execution device, a second enabling process for enabling the first function in the second function execution device, wherein the first function is identified by the first code stored in the memory, in association with the first code, and wherein the first completion information is information indicating that enabling of the first function identified by the first function information is completed in the second function execution device in response to reception of the first code from the second function execution device.

3. The non-transitory computer-readable medium according to claim 1,
wherein the memory stores a model name and executable function information indicating a function, which is executable by a function execution device having the model name, in association with each other, for each of a plurality of model names,
wherein the instructions further cause the computer to:
receive a target model name from the first function execution device, wherein the target model name is a name of the first function execution device; and
determine, in response to the first code and the target model name being received from the first function execution device, whether or not target executable function information in the memory indicates the first function identified by the first function information in the memory, wherein the target executable function information is associated with the target model name, and the first function information is associated with the first code, wherein in response to it being determined that the target executable function information indicates the first function, the first enabling process is executed; and wherein in response to it being determined that the target executable function information does not indicate the first function, the first enabling process is not executed.

4. The non-transitory computer-readable medium according to claim 1, wherein the instructions further causes the computer to:

receive number-of-times information indicating a number of times from the external server;

store, in response to the first function information and the number-of-times information indicating N times being received from the external server, the first function information and N pieces of enabling code in the memory in association with each other, wherein the N pieces of enabling code are different from each other, each of the N pieces of enabling code includes the first code, and N is an integer of 2 or more; and transmit, in response to the first function information and the number-of-times information indicating N times received from the external server, the N pieces of enabling code including the first code to the external server, wherein in response to the first code among the N pieces of enabling code being input to the first function execution device by a first user after the N pieces of enabling code is transmitted to the external server, the first code is received from the first function execution device, wherein the instructions further causes the computer to:

receive, in response to a third code generated by the server among the N pieces of enabling code being input to a third function execution device by a second user after the N pieces of enabling code is transmitted to the external server, the third code from the third function execution device, wherein the third code is different from the first code, and the third function execution device is different from the first function execution device, wherein in response to the first code being received from the first function execution device, the first enabling process is executed, and wherein the instructions further causes the computer to:

execute, in response to the third code being received from the third function execution device, a second enabling process for enabling the first function in the third function execution device, wherein the first function is identified by the first function information in the memory associated with the third code.

5. The non-transitory computer-readable medium according to claim 1, wherein the instructions further causes the computer to:

receive second function information for identifying a second function, from the external server, wherein the second function is different from the first function;

store, in response to the second function information being received from the external server, the second function information and a fourth code generated by the server in the memory in association with each other, wherein the fourth code is different from the first code; and transmit, in response to the second function information being received from the external server, the fourth code to the external server, wherein in response to a predetermined button indicating enabling of a function being selected in the first function execution device and the first code being input to the first function execution device after the first code is transmitted to the external server, the first code is received from the first function execution device, and wherein the instructions further causes the computer to:

receive, in response to the predetermined button being selected in the first function execution device and the fourth code being input to the first function execution device after the fourth code is transmitted to the external server, the fourth code from the first function execution device; and execute, in response to the fourth code being received from the first function execution device, a second enabling process for enabling the second function in the first function execution device, wherein the second function is identified by the second function information in the memory associated with the fourth code.

6. The non-transitory computer-readable medium according to claim 1, wherein the first enabling process is a process of transmitting enabling information to the first function execution device, and wherein the enabling information is information for changing a setting that prevents execution of the first function to a setting that allows the execution of the first function in the first function execution device including a program for executing the first function.

7. The non-transitory computer-readable medium according to claim 1, wherein the first enabling process is a process of changing a setting that prevents execution of the first function by the first function execution device to a setting that allows the execution of the first function by the first function execution device in the server.

8. A non-transitory computer-readable medium having instructions that, when executed by a controller of a server, cause the controller to:

receive, by the server, first function information for identifying a first function from an external server, the external server being different from a first function execution device and the server;

store, by the server, in response to the first function information being received from the external server, the first function information and a first code in a memory of the server, in association with each other, the first code being used to enable the first function;

transmit, by the server, in response to the first function information being received from the external server, the first code to the external server;

store, by the server, in response to the first function information being received from the external server different from the first function execution device, the first function information and a second code generated by the server in the memory of the server, in association with each other, the second code being used to enable the first function; and transmit, by the server, in response to the first function information being received from the external server different from the first function execution device, the second code to the external server, receive, by the server, the first code from the first function execution device;

determine whether the first function execution device has been enabled for the first function by determining, in response to the first code being received from the first function execution device, whether or not a second completion information is stored in the memory in association with the first function information and the second code, the second completion information representing that the first function has been enabled in the first function execution device, execute, by the server, in response to the first code being received from the first function execution device and it being determined that the second completion information is not stored in the memory, a first enabling process for enabling the first function in the first function execution device, wherein the first function is identified by the first function information stored in the memory of the server, in association with the first code, and receive device information for identifying the first function execution device from the first function execution device;

wherein in response to it being determined that the second completion information is stored in the memory, the first enabling process is not executed.

9. The non-transitory computer-readable medium according to claim 8, wherein the instructions further causes the computer to:
determine whether or not the first function identified by the first function information is a predetermined function; and execute, in response to it being determined that the second completion information is stored in the memory and that the first function is the predetermined function, a number-of-times increment process for incrementing an allowable number of times of execution of the first function, wherein the allowable number of times is allowed in the first function execution device, and wherein in response to it being determined that the second completion information is stored in the memory and that the first function is not the predetermined function, the number-of-times increment process is not executed.

10. A server comprising:

a processor; and a memory storing instructions therein, the instructions, when executed by the processor, causing the server to:
receive first function information for identifying a first function from an external server, the external server being different from a first function execution device and the server;

store, in response to the first function information being received from the external server, the first function information and a first code in the memory in association with each other;

transmit, in response to the first function information being received from the external server, the first code to the external server;

receive, by the server, the first code from the first function execution device;

determine whether the first code has been used by determining, in response to the first code being received from the first function execution device, whether or not a first completion information is stored in the memory in association with the first function information and the first code, the first completion information representing that a function has been enabled in a second function execution device which is different from the first function execution device, and execute, in response to the first code being received from the first function execution device and it being determined that the first completion information is not stored in the memory, a first enabling process for enabling the first function in the first function execution device, wherein the first function is identified by the first function information in the memory in association with the first code, wherein in response to it being determined that the first completion information is stored in the memory, the first enabling process is not executed.

11. The server according to claim 10, wherein the first completion information is information indicating that enabling of the first function identified by the first function information is completed in the second function execution device in response to reception of the first code from the first function execution device.

12. The server according to claim 10, wherein the memory stores a model name and executable function information indicating a function, which is executable by a function execution device having the model name, in association with each other, for each of a plurality of model names, wherein the instructions further cause the server to:
receive a target model name from the first function execution device, wherein the target model name is a name of the first function execution device; and determine, in response to the first code and the target model name being received from the first function execution device, whether or not target executable function information in the memory indicates the first function identified by the first function information in the memory, wherein the target executable function information is associated with the target model name, and the first function information is associated with the first code, wherein in response to it being determined that the target executable function information indicates the first function, the first enabling process is executed; and wherein in response to it being determined that the target executable function information does not indicate the first function, the first enabling process is not executed.

13. The server according to claim 10, wherein the instructions further causes the server to:
determine, in response to the first code and device information being received from the first function execution device, whether or not second completion information including the device information is stored in the memory in association with the first function information and a second code wherein the second code is different from the first code, and the second completion information is information indicating that enabling of the first function identified by the first function information is completed in the first function execution device in response to reception of the second code from the first function execution device, wherein in response to it being determined that the second completion information is not stored in the memory, the first enabling process is executed; and wherein in response to it being determined that the second completion information is stored in the memory, the first enabling process is not executed.

14. The server according to claim 13, wherein the instructions further causes the server to:
determine whether or not the first function identified by the first function information is a predetermined function; and execute, in response to it being determined that the second completion information is stored in the memory and that the first function is the predetermined function, a number-of-times increment process for incrementing an allowable number of times of execution of the first function, wherein the allowable number of times is allowed in the first function execution device, and wherein in response to it being determined that the second completion information is stored in the memory and that the first function is not the predetermined function, the number-of-times increment process is not executed.

15. The server according to claim 10, wherein the instructions further causes the server to:

receive the first function information and number-of-times information indicating a number of times from the external server;

store, in response to the first function information and the number-of-times information indicating N times being received from the external server, the first function information and N pieces of enabling code in the memory in association with each other, wherein the N pieces of enabling code are different from each other, each of the N pieces of enabling code includes the first code, and N is an integer of 2 or more; and transmit, in response to the first function information and the number-of-times information indicating N times are received from the external server, the N pieces of enabling code including the first code to the external server, wherein in response to the first code among the N pieces of enabling code being input to the first function execution device by a first user after the N pieces of enabling code is transmitted to the external server, the first code is received from the first function execution device, wherein the instructions further causes the server to:

receive, in response to a third code among the N pieces of enabling code being input to a third function execution device by a second user after the N pieces of enabling code is transmitted to the external server, the third code from the third function execution device, wherein the third code is different from the first code, and the third function execution device which is different from the first function execution device, wherein in response to the first code being received from the first function execution device, the first enabling process is executed, and wherein the instructions further causes the server to:

execute, in response to the third code being received from the third function execution device, a second enabling process for enabling the first function in the third function execution device, wherein the first function is identified by the first function information in the memory associated with the third code.

16. The server according to claim 10, wherein the instructions further causes the server to:

receive second function information for identifying a second function from the external server, wherein the second function is different from the first function;

store, in response to the second function information being received from the external server, the second function information and a fourth code in the memory in association with each other, wherein the fourth code is different from the first code; and transmit, in response to the second function information being received from the external server, the fourth code to the external server, wherein in response to a predetermined button indicating enabling of a function being selected in the first function execution device and the first code is input to the first function execution device after the first enabling code is transmitted to the external server, the first enabling code is received from the first function execution device, and wherein the instructions further causes the server to:

receive, in response to the predetermined button being selected in the first function execution device and the fourth code being input to the first function execution device after the fourth code is transmitted to the external server, the fourth code from the first function execution device; and execute, in response to the fourth code being received from the first function execution device, a second enabling process for enabling the second function in the first function execution device, wherein the second function is identified by the second function information in the memory associated with the fourth code.

17. The server according to claim 10, wherein the first enabling process is a process of transmitting enabling information to the first function execution device, and wherein the enabling information is information for changing a setting that prevents execution of the first function to a setting that allows the execution of the first function in the first function execution device including a program for executing the first function.

18. The server according to claim 10, wherein the first enabling process is a process of changing a setting that prevents execution of the first function by the first function execution device to a setting that allows the execution of the first function by the first function execution device in the server.

* * * * *